US012759593B2

(12) United States Patent
Tanaka et al.

(10) Patent No.: US 12,759,593 B2
(45) Date of Patent: Oct. 13, 2026

(54) VEHICLE

(71) Applicant: TOYOTA JIDOSHA KABUSHIKI KAISHA, Toyota (JP)

(72) Inventors: Go Tanaka, Toyota (JP); Hirohito Ide, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 19/176,545

(22) Filed: Apr. 11, 2025

(65) Prior Publication Data

US 2025/0368234 A1 Dec. 4, 2025

(30) Foreign Application Priority Data

May 28, 2024 (JP) ................................ 2024-086298

(51) Int. Cl.
*B60W 60/00* (2020.01)
*B60W 50/08* (2020.01)

(52) U.S. Cl.
CPC ........ *B60W 60/005* (2020.02); *B60W 50/085* (2013.01); *B60W 60/001* (2020.02); *B60W 2510/1005* (2013.01)

(58) Field of Classification Search
CPC ............ B60W 60/005; B60W 50/085; B60W 60/001; B60W 2510/1005; B60W 2050/0006; B60W 60/0051; B60W 50/00; B60W 60/00; B60W 2050/0062; B60Y 2304/076
USPC .......................................................... 701/23
See application file for complete search history.

(56) References Cited

U.S. PATENT DOCUMENTS

2021/0237765 A1* 8/2021 Ando .................. B60W 60/001
2022/0258768 A1* 8/2022 Suzuki ................... B60K 20/02
2023/0110042 A1* 4/2023 Yamamoto ............ B60W 10/26 701/22

FOREIGN PATENT DOCUMENTS

JP 2021-123135 A 8/2021

* cited by examiner

*Primary Examiner* — Matthias S Weisfeld
*Assistant Examiner* — Preston Jay Miller
(74) *Attorney, Agent, or Firm* — SoraIP, Inc.

(57) ABSTRACT

VCIB executes a process including a step of determining whether or not a Wake command has been received, a step of determining whether or not the shift lever is parking, a step of determining whether or not the vehicle speed is 0 km/h, a step of determining whether or not the vehicle speed is the automatic mode, and a step of setting the power supply command to "No Request" when the shift lever is not parking, the vehicle speed is not 0 km/h, or the automatic mode.

4 Claims, 6 Drawing Sheets

| API COMMANDS | VALUE | CONTENT |
|---|---|---|
| POWER MODE COMMAND | 0 | No Request |
| | 2 | Wake : VCIB START + BODY ECU START |
| | 6 | Drive : VEHICLE READY ON |

VEHICLE

CROSS-REFERENCE TO RELATED APPLICATION

This application claims priority to Japanese Patent Application No. 2024-086298 filed on May 28, 2024, incorporated herein by reference in its entirety.

BACKGROUND

1. Technical Field

The present disclosure relates to a vehicle.

2. Description of Related Art

In recent years, there has been developed an autonomous driving system that causes a vehicle to travel without receiving an operation by a user. The autonomous driving system may be provided separately from a vehicle via an interface, in order to be mountable on an existing vehicle, for example.

Japanese Unexamined Patent Application Publication No. 2021-123135 (JP 2021-123135 A), for example, discloses a technique of setting various power supply modes for an autonomous driving system.

SUMMARY

In a vehicle equipped with the above-described autonomous driving system, autonomous driving is occasionally ended during an autonomous mode in which the autonomous driving can be performed. In this case, a request is occasionally made to activate a part of devices that are used to resume the autonomous driving on the vehicle side in preparation for resuming the autonomous driving, and to deactivate the other devices. When the other devices are deactivated according to the request from the autonomous driving system, however, communication is interrupted in each of the other devices, and it is determined that the vehicle is in a failed state, and the autonomous driving may not be resumed.

The present disclosure has been made in order to address the above-described issue, and has an object to provide a vehicle that performs appropriate operation in response to a request from an autonomous driving system.

An aspect of the present disclosure provides a vehicle including: an autonomous driving system that performs autonomous driving of a vehicle; and a vehicle platform capable of receiving a command related to the autonomous driving from the autonomous driving system.

The vehicle platform includes a base vehicle including a plurality of control devices and a vehicle control interface that interfaces between the vehicle platform and the autonomous driving system.

The vehicle control interface deactivates a part of the control devices of the vehicle platform during execution of the autonomous driving, and disables a wake command when the wake command is received from the autonomous driving system, the wake command requesting a transition to a power mode in which the vehicle control interface is activated.

With such a configuration, the wake command is disabled by the base vehicle even if the wake command is received from the autonomous driving system during execution of the autonomous driving, and thus it is possible to suppress a part of the control devices being deactivated. Accordingly, it is possible to suppress it being determined that the vehicle is in a failed state with communication interrupted or the like due to a part of the control devices being deactivated. Therefore, it is possible to quickly resume the autonomous driving.

In another aspect, when the base vehicle receives the wake command from the vehicle control interface, the base vehicle may activate the vehicle control interface and a body system control device, among the control devices, and deactivate another control device.

With such a configuration, when the base vehicle receives the wake command, it is possible to shift to a power supply mode in which the body system control device, among the control devices, is activated and the other control device is deactivated.

In still another aspect, the vehicle may further include an operation member that receives an operation to switch between activation of the vehicle and deactivation of the vehicle. When the operation member receives an operation to deactivate the vehicle, the vehicle platform may assume that the wake command has been received, and activate the vehicle control interface and a body system control device, among the control devices, and deactivate another control device.

With such a configuration, when the operation member receives an operation to stop the vehicle, it is possible to shift to a power supply mode in which the body system control device, among the control devices, is activated and the other control device is deactivated.

In still another aspect, when the wake command is received when a shift position is a parking position, while the vehicle is stationary, and during execution of manual driving in which the base vehicle is operable by a user, the vehicle platform may activate a body system control device, among the control devices, and deactivate another control device.

With such a configuration, when the vehicle is stationary and the shift position is the parking position, it is possible to shift to a power supply mode in which the body system control device, among the control devices, is activated and the other control device is deactivated.

According to the present disclosure, it is possible to provide a vehicle that performs appropriate operation in response to a request from an autonomous driving system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
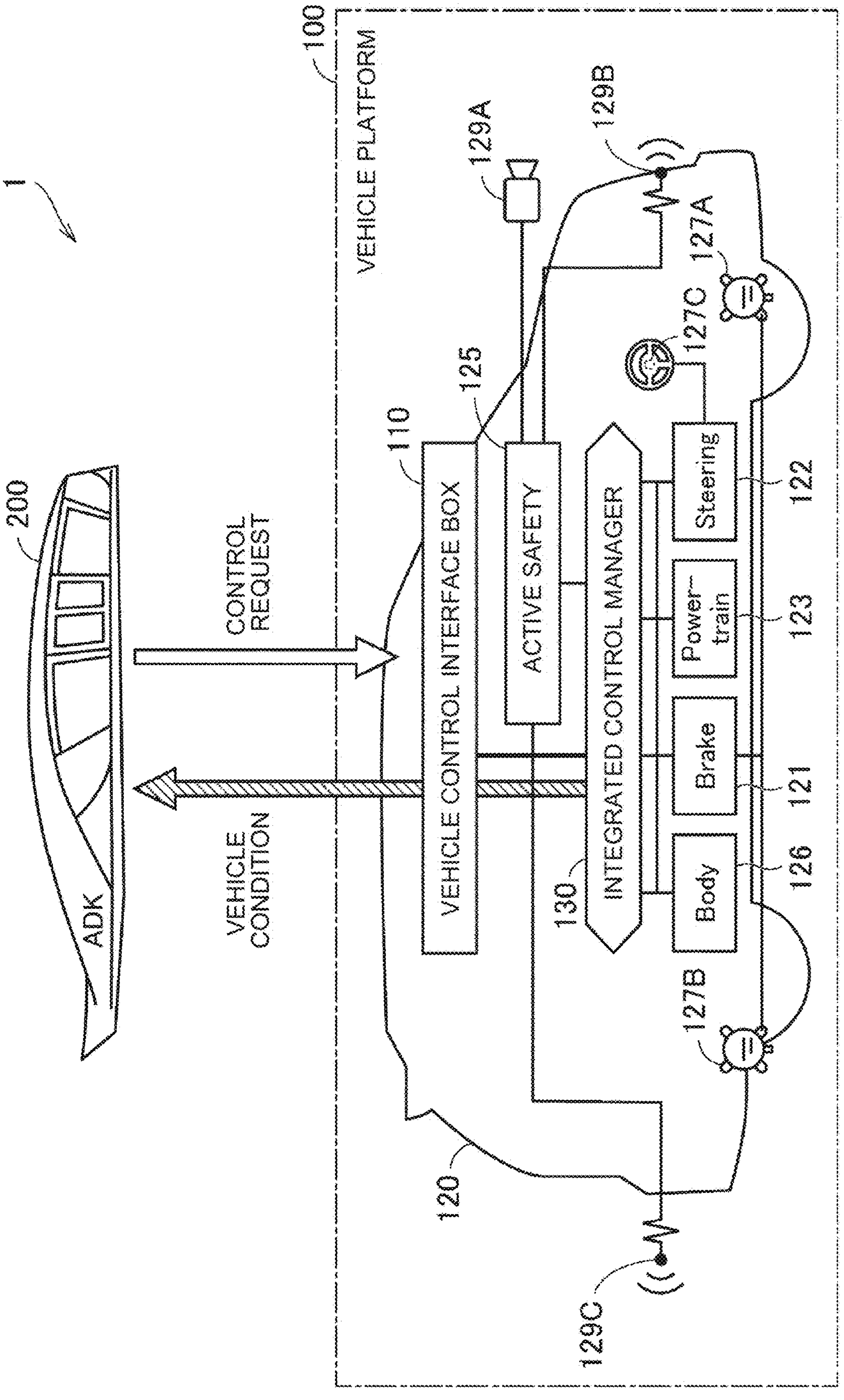
FIG. 1 is a diagram illustrating a schematic configuration of a vehicle according to an embodiment of the present disclosure.

Hereinafter, an embodiment of the present disclosure will be described in detail with reference to the drawings. In the drawings, the same or corresponding portions are denoted by the same reference signs and the description thereof will not be repeated.

FIG. 1 is a diagram illustrating a schematic configuration of a vehicle according to an embodiment of the present disclosure. Referring to FIG. 1, a vehicle 1 includes a VP (vehicle platform) 100 and a detachable ADK (Autonomous driving Development Kit) 200. VP 100 includes a VCIB (Vehicle Control Interface Box) 110 and a base vehicle 120. The vehicle 1 capable of autonomous driving are configured by attaching an ADK 200 to a predetermined position (for example, a rooftop) of a VP 100. The base vehicle 120 is an electrified vehicle such as a battery electric vehicle or a hybrid electric vehicle. The base vehicle 120 includes an integrated control manager 130, various systems for controlling the base vehicle 120, and various sensors (wheel speed sensors 127A, 127B, steering angle sensor 127C, and the like). The base vehicle 120 comprises a camera 129A and radar sensors 129B, 129C for the active safety system 125 to detect crash risks. The integrated control manager 130 integrates and controls various systems related to the operation of the base vehicle 120 based on the detection result of the in-vehicle sensor.

Figure 2:
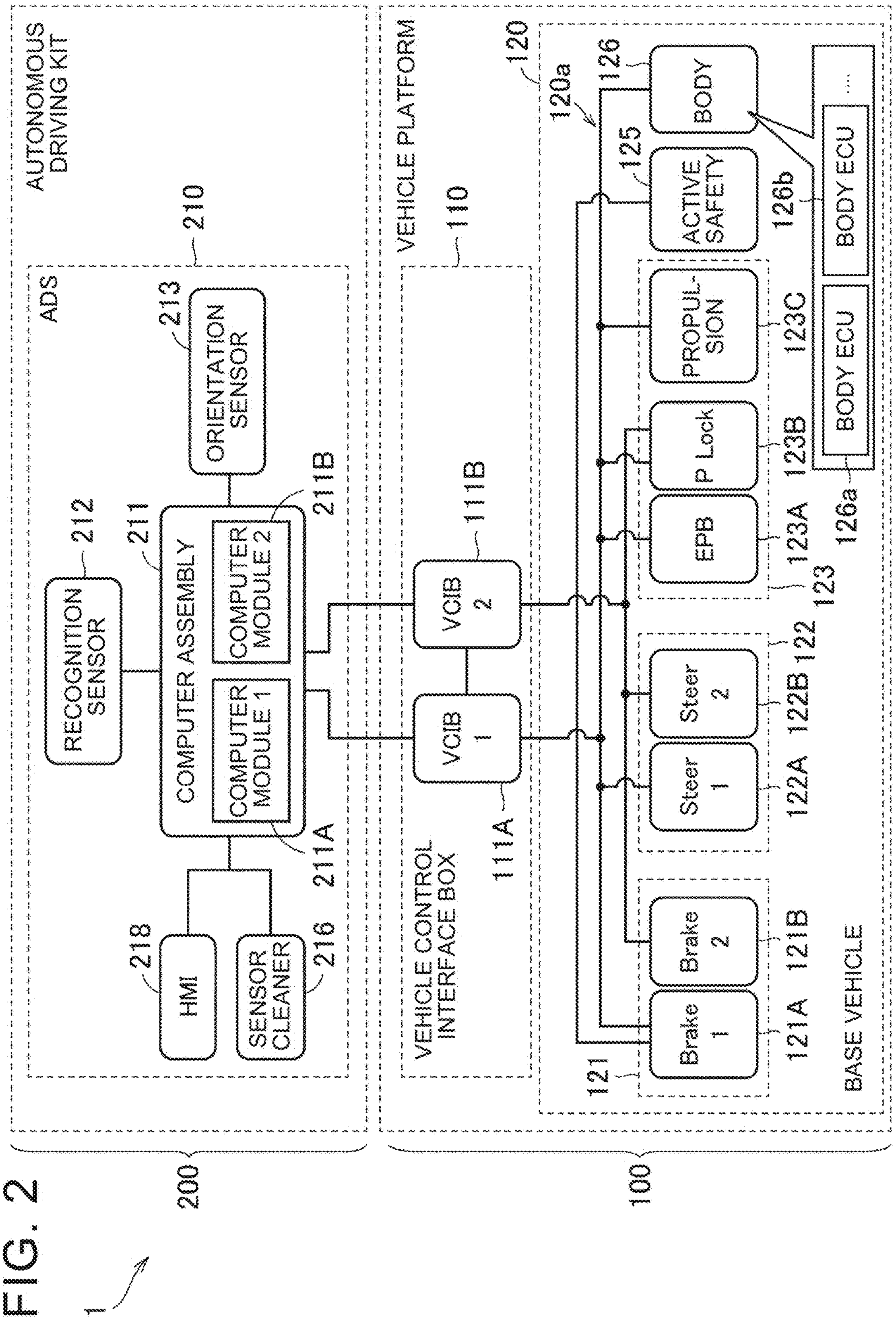
FIG. 2 shows details of a control system of a vehicle.

FIG. 2 is a diagram illustrating details of a control system of the vehicle 1. Referring to FIGS. 1 and 2, ADK 200 includes an autonomous driving system (hereinafter referred to as "ADS") 210 for performing autonomous driving of the vehicle 1. ADS 210 includes a computer assembly (hereinafter referred to as "CA") 211, a recognition sensor 212, an attitude sensor 213, a sensor cleaner 216, and an HMI (Human Machine Interface) 218.

CA 211 includes computer modules (hereinafter referred to as "ADCs") 211A, 211B. Each of ADCs 211A, 211B includes a processor and a storage device that stores autonomous driving software using a API, which will be described later, and is configured to be capable of executing autonomous driving software by the processor. The recognition sensor 212 acquires environment information indicating an external environment of the vehicle 1. The recognition sensor 212 may include at least one of a camera, a millimeter wave radar, and a lidar. The attitude sensor 213 acquires attitude information regarding the attitude of the vehicle 1. The attitude sensor 213 may include various sensors for detecting acceleration, angular velocity, and position of the vehicle 1. HMI 218 includes an inputting device and a notification device.

The base vehicle 120 includes a vehicle system 120*a*. The vehicle system 120*a* comprises a brake system 121, a steering system 122, a powertrain system 123, an active safety system 125, and a body system 126. In this embodiment, the electronic control unit (hereinafter also referred to as "ECU") is provided.

VCIB 110 is configured to communicate with both the base vehicle 120 and ADK 200 via communication busses, such as by CAN (Controller Area Network) communication. In the vehicle 1, a control system related to the behavior (running, stopping, and bending) of the vehicle 1 has redundancy. ADCs 211A, 211B give instructions to the main-control system and the sub-control system, respectively. VCIB 110 includes a VCIB 111A (a control unit of a main control system) and a VCIB 111B (a control unit of a sub-control system). Each control unit may include a computer including a processor and a storage device. VCIBs 111A, 111B may be in direct communication with the respective systems, or may be in communication via the integrated control manager 130 shown in FIG. 1.

The brake system 121 includes a braking device, a brake pedal, and a brake control units 121A, 121B. The steering system 122 includes a steering device, a steering wheel, and a steering control units 122A, 122B. The powertrain system 123 includes a shifting device, a vehicular driving device, an EPB (Electric Parking Brake) device, and a parking locking device (P-Lock device). The powertrain system 123 includes an EPB control unit 123A, a P-Lock control unit 123B, and a propulsion control unit 123C. The shift device determines the shift range, and switches the propulsion direction and the shift mode of the vehicle 1 according to the shift range after the determination. The shift device includes a transmission and a shift lever. The vehicle driving device applies a propulsive force in a propulsion direction indicated by the shift range. The vehicle driving device includes a main battery, a traveling motor using the main battery as a power supply source, and an accelerator pedal that receives an acceleration operation. P-Lock device further includes an actuator for operating the parking locking device and an operation unit for receiving a parking operation.

The body system 126 includes a body system component (for example, a direction indicator, a horn, and a wiper) and a body system control device (body system ECU) that controls the body system component. In the manual mode, the body ECU controls the body system component according to the user's manipulation, and in the automated mode, controls the body system component according to a command from ADK 200. In this embodiment, the body system 126 includes a plurality of body system control devices (including body system ECU 126*a* and 126*b*). However, the number of the body system control devices is arbitrary, and may be one.

Figure 3:
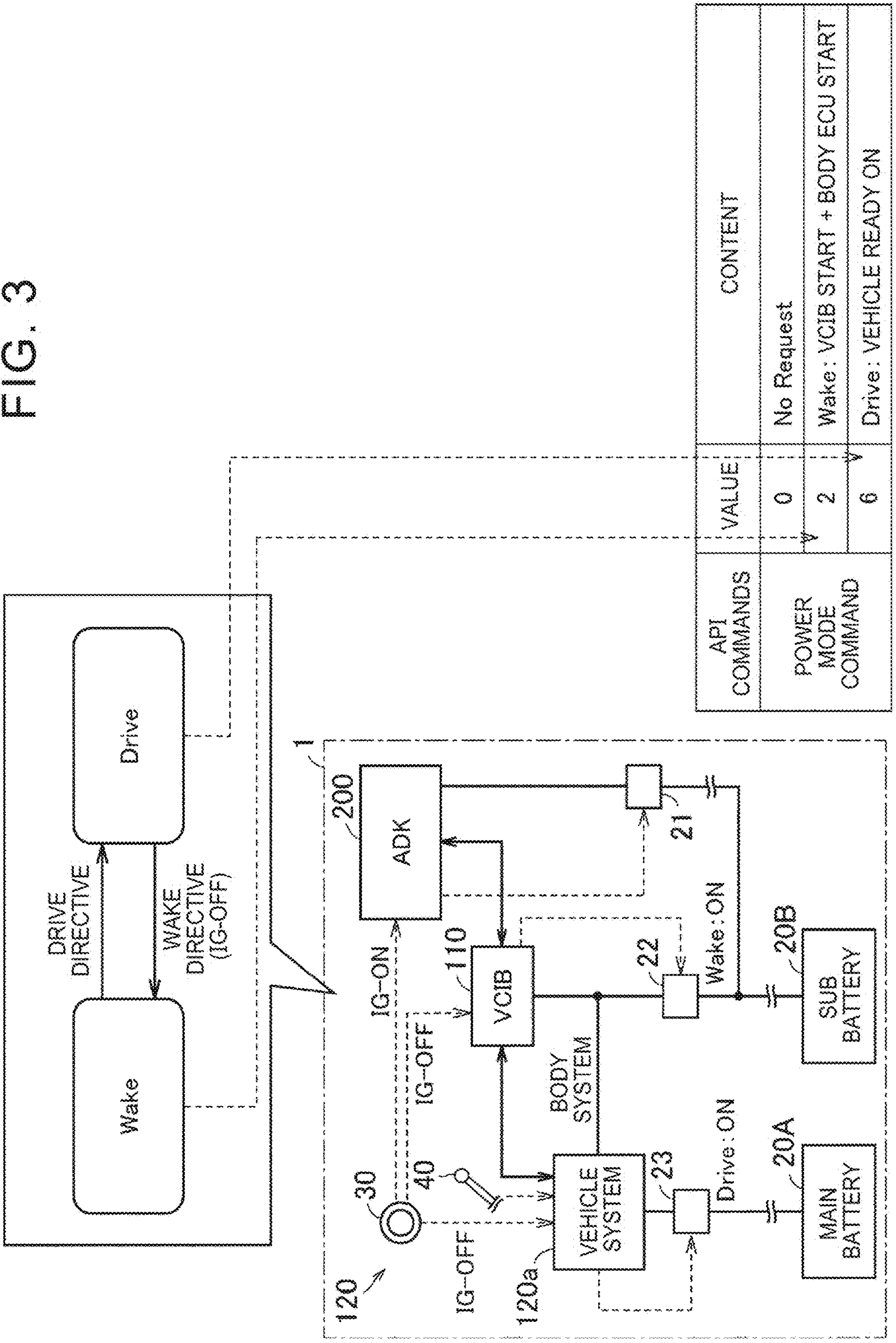
FIG. 3 is a diagram for explaining an example of a method of controlling a power supply mode.

FIG. 3 is a diagram for explaining an example of a method of controlling the power supply mode. In FIG. 3, the base vehicle 120 includes a vehicle system 120*a*, a main battery 20A, a sub-battery 20B, switching circuits 21 to 23, an activation switch 30, and a shift lever 40. The activation switch 30 is an operation unit such as a "power switch" or an "ignition switch" that accepts a user operation for switching between the activation and deactivation of the system. The shift lever 40 is an operation unit of the shift device described above. The shift lever 40 designates a shift range in response to a shift operation. The shift range of the vehicle 1 includes P (parking), R (reverse), N (neutral), and D (drive).

The main battery 20A is included in the above-described vehicle driving device. The sub-battery 20B is an auxiliary battery. The control devices included in the vehicle 1 are supplied with electric power from at least one of the main battery 20A and the sub-battery 20B. ADCs 211A, 211B may be supplied with electric power from a power storage device mounted on ADK 200.

The power mode of VP 100 includes a wake mode (Wake Mode) and an in-operation mode (Driving Mode). In wake mode, VCIB is activated. In this condition, there is no power supply from the main battery 20A, and ECU other than VCIB is not activated except for a part of the body system ECU, and the respective control devices (VCIBs 111A, 111B) included in VCIB 110 are activated by the power supply from the sub-battery 20B. The predetermined body system control device may be a body system ECU 126*a* or may include a plurality of body system ECU.

In the running mode, electric power is supplied from the main battery 20A to the entire VP 100 (all the control devices included in the vehicle system 120*a* and all the control devices included in VCIB 110), and the power supply is turned ON (vehicle power supply ON). In the driving mode, the vehicle system 120*a* communicates with ADK 200 via VCIB 110. A signal (API signal) defined by API (Application Program Interface) is used for communication between ADK 200 and VCIB 110. ADK 200 is configured to process various types of signals defined in API. ADK 200 outputs various commands (API commands described below) defined by API to VCIB 110. ADK 200 receives, from VCIB 110, various API statuses indicating the status of the base vehicle 120. Both API and API statuses correspond to API.

The power mode command is a API command requesting control of the power mode of VP 100. In the power mode command, one of a value "O" indicating no request (No Request), a value "2" requesting transition to the wake mode, and a value "6" requesting transition to the in-operation mode is set. Hereinafter, the power mode commands indicating the values "2" and "6" are referred to as "Wake command" and "Drive command", respectively.

The vehicular mode command is a API command requesting a transition to an automated mode or a manual mode. The propulsion direction command is a API command requesting switching of a shift range (R/D). The shift range can be switched according to the propulsion direction command only when the traveling direction status described later indicates a stop. The acceleration command is a API command for instructing the acceleration of the vehicle. The acceleration command requests acceleration (+) and deceleration (−) with respect to a direction indicated by a propulsion direction status to be described later. The immobilization command is a API command requesting application or removal of immobilization. The application of immobilization means that EPB is in ON state (operating state) and the shift range is in the P (parking) state.

Upon receiving various API commands from ADK 200, VCIB 110 converts API commands into the form of signals executable in the base vehicle 120. VCIB 110 outputs the converted API command (hereinafter, referred to as an in-vehicle command) to the base vehicle 120.

ADK 200 grasps the state of the base vehicle 120 by using various API statuses (such as a power mode status, a vehicle mode status, a traveling direction status, a vehicle speed status, a propulsion direction status, a shift lever status, and a shift lever intervention status) received from VCIB 110. The power mode status indicates the status of VP 100 power mode, and the wake mode or in-operation mode is set as the power mode status.

The vehicle mode status indicates a vehicle mode state. The vehicle mode includes a manual mode, an automatic mode, and a standby mode. The manual mode is a vehicle mode in which the vehicle is under the control of a driver (human). The automatic mode is a vehicle mode in which the vehicle platform (including the base vehicle) is under control of the autonomous driving kit. The standby mode is a vehicle mode in which movement of the vehicle is prohibited. In the initial state, the vehicle mode is the manual mode. The driver can select a desired vehicle-mode through the in-vehicle HMI. The base vehicle 120 determines the vehicle mode in consideration of the situation of the vehicle 1 and the selection of the driver. As the vehicle mode status, a status corresponding to the current mode is output.

The traveling direction status indicates a traveling direction of the vehicle, and any one of a forward state, a backward state, and a stop (Standstill) state is outputted. The vehicle speed status indicates the speed (absolute value) in the longitudinal direction of the vehicle. The vehicle speed (longitudinal speed of the vehicle) may be an estimate. The propulsion direction status indicates the current shift range. As the propulsion direction status, a value corresponding to the current shift range (any of P, R, N, D, and undefined) is output.

The shift lever status indicates the state of the shift lever 40. As the shift lever status, a value corresponding to the current position (any of P, R, N, D, and undefined) of the shift lever 40 is output. The shift lever intervention status indicates whether an operation to change the position of the shift lever 40 has been performed by the driver. In the automatic mode, the shift lever operation by the driver is not accepted.

VCIB 110 receives various sensor detection values and status determination results from the base vehicle 120, and outputs various API statuses to ADK 200. VCIB 110 outputs API status acquired from the base vehicle 120 to ADK 200.

Each of the switching circuits 21 to 23 is configured to switch between a connection state (closed) and a disconnection state (open) of the electric circuit by an electromagnetic relay or the like. The sub-battery 20B supplies power to ADK 200 (ADCs 211A, 211B) via the switching circuit 21. The state (connection/disconnection) of the switching circuit 21 is switched according to the state (activation/deactivation) of the activation switch 30. Even if each of ADCs 211A, 211B is stopped, an activation request from the activation switch 30 acts on the switching circuit 21 by turning on the activation switch 30, and the switching circuit 21 is switched from the disconnected state to the connected state. The sub-battery 20B supplies electric power to each of a predetermined body system ECU (hereinafter, referred to as "wake ECU") that is activated in the wake mode and VCIBs 111A, 111B via the switching circuit 22. Even if each of VCIBs 111A, 111B is stopped, the switching circuit 22 is connected by a Wake command from ADK 200. The main battery 20A supplies power to the vehicle system 120*a* via switching circuit 23. Even when the vehicle system 120*a* is stopped, the switching circuit 23 is switched from the disconnected state to the connected state by Drive command from ADK 200.

In the wake mode, the switching circuits 21, 22, and 23 are connected, connected, and disconnected, respectively. In the in-operation mode, all of the switching circuits 21 to 23 are in the connected state.

The state (activation/deactivation) of the activation switch 30 is switched in response to a user operation. Hereinafter, the state in which the activation switch 30 indicates the activation is referred to as "IG-ON", and the state in which the activation switch 30 indicates the deactivation is referred to as "IG-OFF". A user operation (hereinafter referred to as "OFF operation") that turns the activation switch 30 OFF turns IG-OFF. However, OFF operation is valid only when a predetermined OFF condition is satisfied, and OFF operation is invalid when OFF condition is not satisfied. The power mode of VP 100 transitions to the wake mode by a valid OFF action on the activation switch 30.

Figure 4:
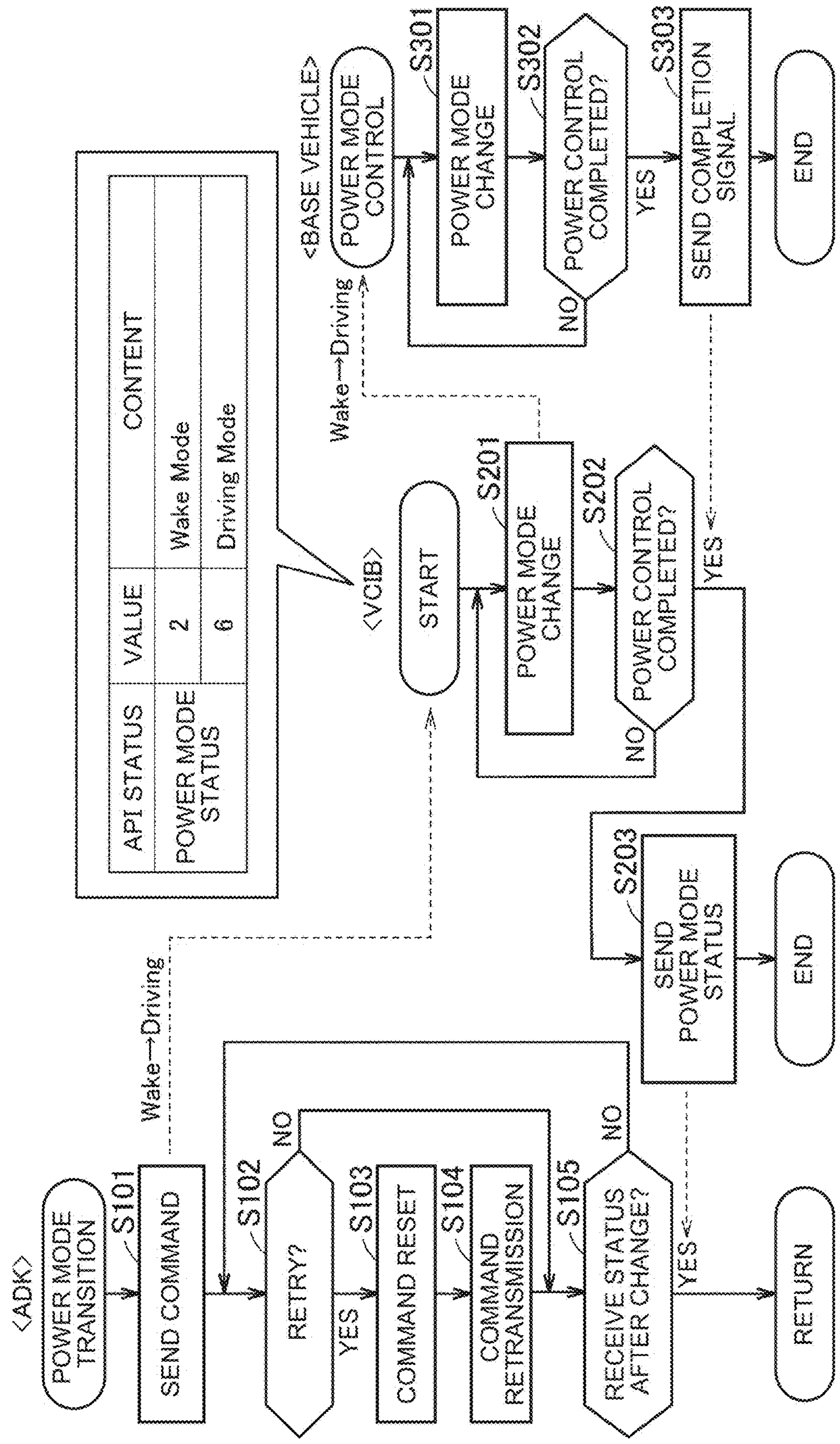
FIG. 4 is a flowchart for explaining an example of a method of controlling a power supply mode.

FIG. 4 is a flowchart for explaining an example of a method of controlling the power supply mode. Hereinafter, each step in the flowchart will be referred to as "S". Referring to FIG. 4, ADK 200 executes a S105 process from S101. VCIB 110 executes S203 process flow from S201. This process is executed by VCIB 111A or VCIB 111B when VCIB 111A is abnormal. A plurality of control devices (for example, the integrated control manager 130 illustrated in FIGS. 1 and 2 and the control devices of the respective systems) included in the base vehicle 120 execute the process flow of S303 from S301.

In S101, ADK 200 sends a power mode command (Wake command or Drive command) to VCIB 110. When VCIB 110 receives the power mode command, S201 starts S203 process. In S201, VCIB 110 executes a process according to the power mode command. In S202, VCIB 110 determines whether or not the power mode control according to the power mode command is completed. For example, a stopped VCIB 110 may be activated upon receipt of a Wake command. When VCIB 110 is activated (YES in S202), VCIB 110 transmits a power mode status indicating a wake mode to ADK 200 in S203. On the other hand, when VCIB 110 receives Drive command in the wake mode, VCIB 110 transmits an inside command corresponding to Drive command to the base vehicle 120 (S201). When the base vehicle 120 receives this command, S303 process is started from S301. In S301, the base vehicle 120 performs power mode control according to a power mode command. In S302, the base vehicle 120 determines whether the power-supply-mode control according to the power-supply-mode command is completed. When the transition from the wake mode to the in-operation mode is completed in accordance with Drive command (YES in S302), the base vehicle 120 transmits a completion signal indicating completion of the power-supply mode control to VCIB 110 in S303. When VCIB 110 receives this completion signal (YES at S202), VCIB 110 sends a power mode status to ADK 200 at S203 indicating an in-operation mode.

After transmitting the power mode command in S101, ADK 200 determines whether or not the retry condition is satisfied in the subsequent S102. For example, even if a predetermined time (for example, 4 seconds) has elapsed since ADK 200 transmitted the power mode command, ADK 200 may not receive the power mode status indicating that the power mode change according to the power mode command has been performed. In this case, the retry condition is satisfied. When the retry condition is satisfied (YES in S102), ADK 200 sets the power mode command to "0" in S103. ADK 200 then resets the power mode command and sends the power mode command again to VCIB 110 at S104. Thereafter, the process proceeds to S105. If the retry condition is not satisfied (NO in S102), the process proceeds to S105.

S105 determines whether ADK 200 has received a power mode status (S203) indicating that a power mode change has been made in accordance with a power mode command. If it is determined that ADK 200 has not received the power mode status (NO at S105), the process returns to S102. If it is determined that ADK 200 has received the power mode status (YES at S105), the process is terminated.

Figure 5:
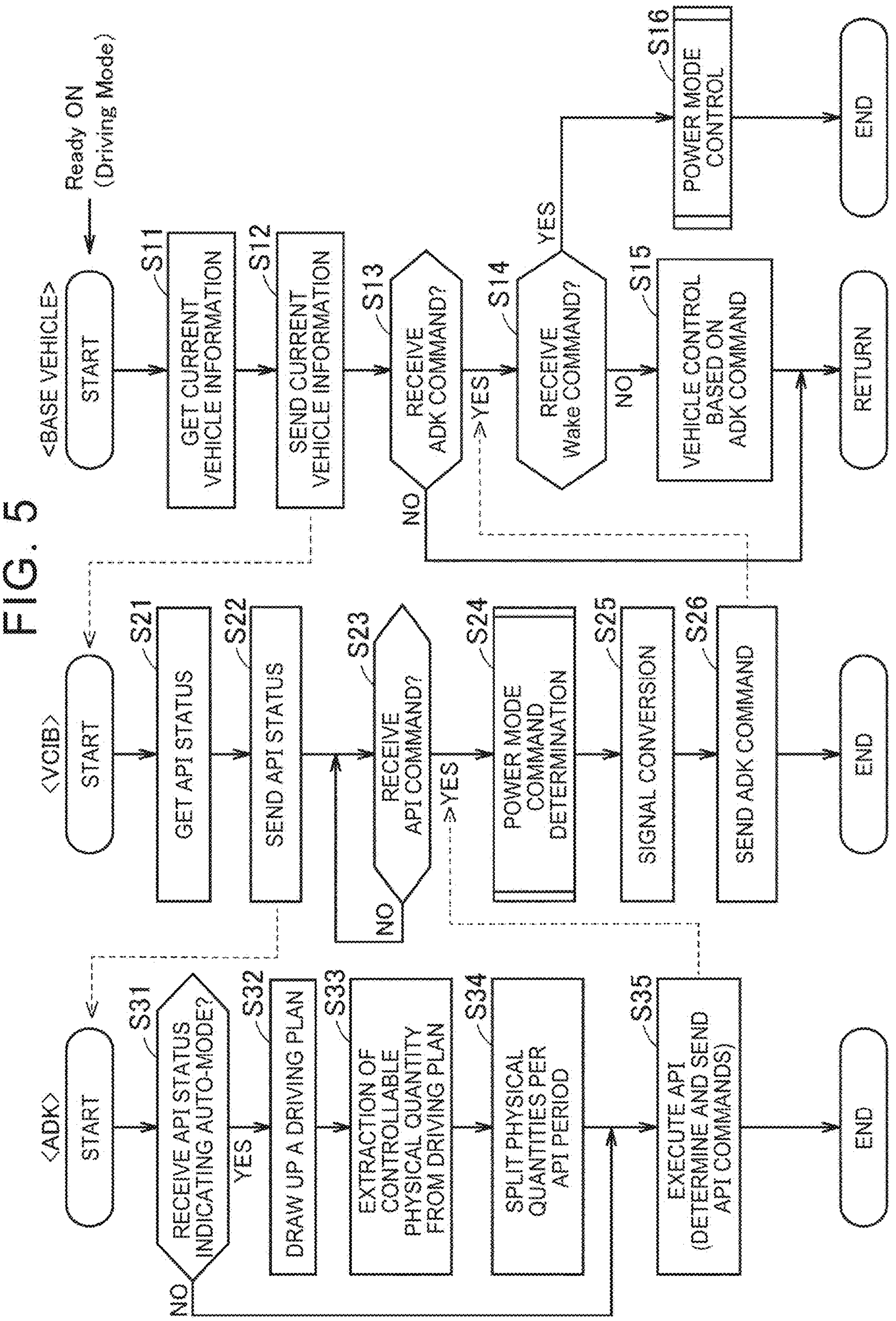
FIG. 5 is a flow chart for describing an exemplary autonomous driving control of vehicles.

FIG. 5 is a flowchart for explaining an example of autonomous driving control of the vehicle 1. When the power supply mode of VP 100 becomes the in-operation mode, the control device included in the vehicle system 120*a* starts S16 process flow from S11. Referring to FIG. 5, in S11, the base vehicle 120 acquires the present vehicle data. In S12, the base vehicle 120 transmits the obtained vehicle data to VCIB 110. The current vehicle information includes various sensor detection values indicating the current state of the base vehicle 120 and a state determination result based on a user operation or a sensor detection value. After transmitting the vehicle data, the base vehicle 120 determines whether or not a command (ADK command) from ADK 200 has been received by S13. While the base vehicle 120 does not receive ADK command (NO in S13), S13 is repeated from S11 and the process does not proceed to S14.

S26 from S21 is executed by VCIB 110 (VCIB 111A or 111B). When VCIB 110 receives the present vehicle data from the base vehicle 120, it starts a process flow. In S21, VCIB 110 obtains various API statuses indicating the status of the current base vehicle 120 based on the current vehicle data. VCIB 110 may determine values of various API statuses based on various sensor detected values. In the following S22, VCIB 110 transmits various API statuses acquired by S21 to ADK 200. Thereafter, VCIB 110 waits for a API command while determining whether a API command has been received from ADK 200 at S23. While VCIB 110 does not receive API command (NO in S23), the process does not proceed to S24.

S35 from S31 is executed by ADK 200 (ADC 211A or 211B). Upon receiving API status from VCIB 110, ADK 200 starts a process flow. In S31, ADK 200 determines whether the received vehicular mode status indicates the auto mode. The vehicular mode status may indicate auto mode (YES in S31). In this case, ADK 200 creates the travel plan on the basis of the detection results (for example, environmental information and attitude information) of the various sensors and API status acquired from VCIB 110 in S32. The travel plan is data indicating the behavior of the target vehicle 1 in a predetermined period. ADK 200 may calculate the behavior (vehicle speed, attitude, and the like) of the vehicle 1 and create a travel plan suitable for the condition of the vehicle 1 and the external environment. In the following S33, ADK 200 extracts a control physical quantity (acceleration, tire-breaking angle, and the like) from the travel plan created by S32. In the following S34, ADK 200 divides the physical quantity extracted by S33 for each API cycle. ADK 200 obtains an autonomous driving command (a value of various API commands) for realizing the physical quantity according to the traveling plan, based on the divided physical quantity. Thereafter, the process proceeds to S35. When the vehicle mode status does not indicate the automatic mode (NO in S31), the process proceeds to S35 without generating the autonomous driving command.

In S35, ADK 200 obtains API command other than the autonomous driving command. ADK 200 sends various API commands to VCIB 110. ADK 200 determines the power mode command based on the condition of the vehicle 1. If the determined power mode command requires a power mode change, ADK 200 may perform a retry from S101 shown in FIG. 4 according to S105 process flow. The retry interval of the power mode command may be 4 seconds or more. API command transmitted in S35 corresponds to a command to the base vehicle 120. In the auto-mode, a API command indicating the auto-driving command is determined from S32 by S34 and transmitted by S35. When S35 process is executed, S31 completes S35 process sequence. However, each time ADK 200 receives a API status (S22), the process flow is started. When VCIB 110 receives API command (YES in S23), it determines the power mode command in S24. VCIB 110 changes the power mode command set by ADK 200 if VCIB 110 does not accept the power mode command from ADK 200.

VCIB 110 determines the power mode command in S24, and then converts the various API commands received from ADK 200 into an internal command in the subsequent S25. These transformations result in a command corresponding to API command. In a subsequent S26, VCIB 110 transmits the obtained ADK command to the base vehicle 120. When S26 process is executed, S26 process from S21 ends. However, each time VCIB 110 receives the most recent vehicle data from the base vehicle 120, the process flow is started.

When the base vehicle 120 receives various internal commands (ADK commands) corresponding to various API commands from VCIB 110 (YES in S13), the base vehicle 120 determines whether the received internal commands include internal commands corresponding to Wake commands in S14. When the base vehicle 120 receives the internal command corresponding to Wake command (YES in S14), the base vehicle 120 executes the power-supply-mode control according to Wake command from S301 shown in FIG. 4 by S303 process flow in S16. In S301, the power mode is changed from the in-operation mode to the wake mode. Accordingly, the plurality of control devices included in the vehicle system 120*a* are stopped except for a part of the body system ECU (wake ECU).

When the internal command corresponding to Wake command is not included in the internal command (ADK command) received from VCIB 110 (NO in S14), the base vehicle 120 executes the vehicle control according to ADK command in S15. In the autonomous mode, the base vehicle 120 executes autonomous driving control according to the autonomous driving command from ADK 200. The power mode of VP 100 is maintained in the operation mode. The process then returns to the first step (S11).

In the vehicle 1 that performs the above-described operation, the autonomous driving may be ended in the automatic mode in some cases. When Wake command is transmitted to VP 100 through VCIB 110 in preparation for restarting the autonomous driving, the plurality of control devices included in the vehicle system 120*a* are stopped except for a part of the body system ECU. Therefore, each of the plurality of control devices except for a part of the body system ECU is in a state where communication is also interrupted. Consequently, in at least one of the plurality of control devices excluding some body system ECU, it may be determined that the communication is interrupted. As a consequence, even if a subsequent Drive command is received, it may not be possible to resume the autonomous operation.

Therefore, in the present embodiment, it is assumed that VCIB 110 invalidates Wake command when ADK 200 receives Wake command during the auto-mode.

With this configuration, even if Wake command is received from ADK 200 during the auto-mode, the wake command is invalidated, so that it is possible to suppress a part of the plurality of control devices being stopped. As a result, it is possible to suppress a failure state being determined by interrupting communication or the like due to a part of the plurality of control devices being in a stopped state. Therefore, it is possible to quickly resume the autonomous driving.

Figure 6:
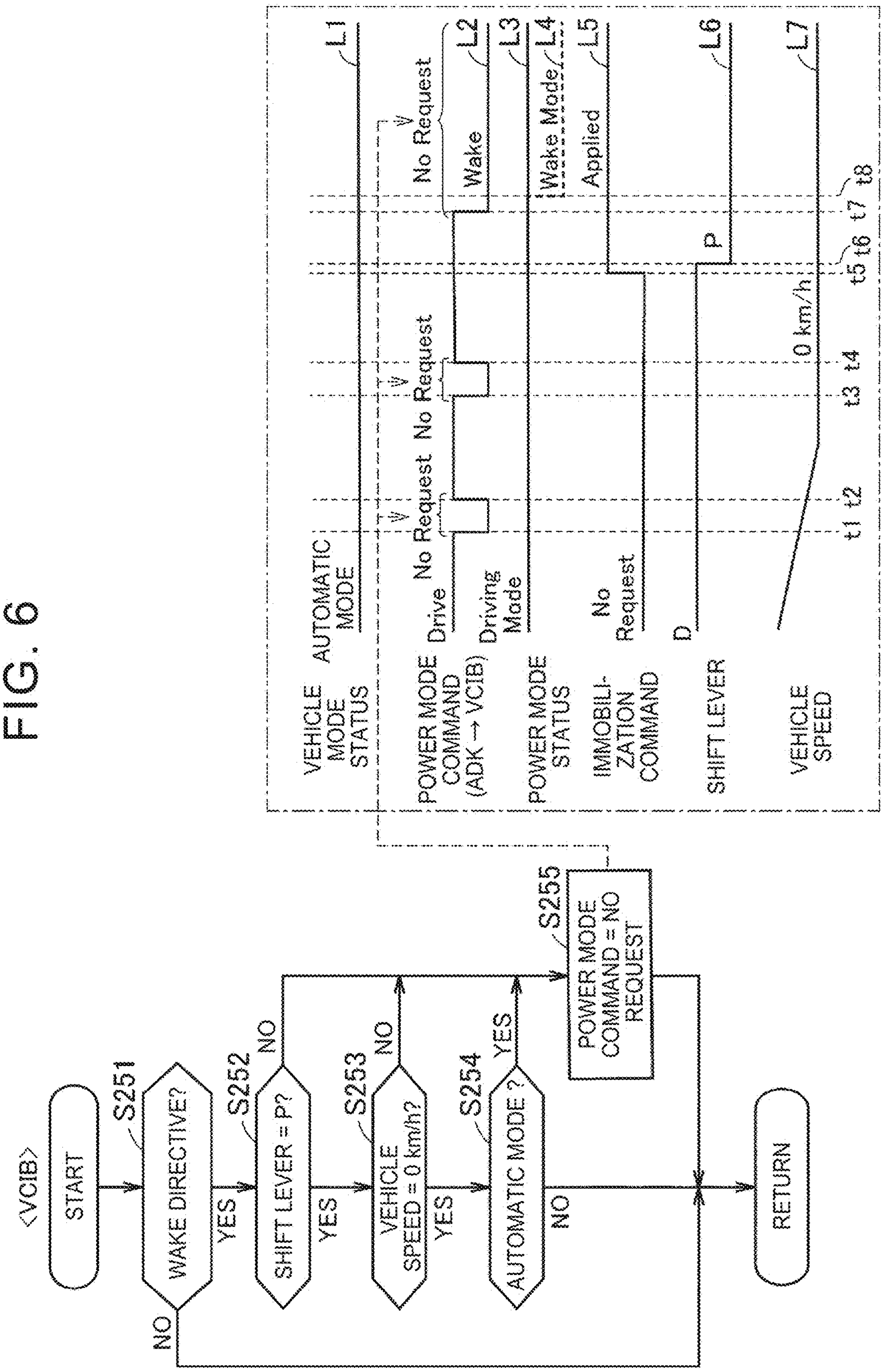
FIG. 6 is a flowchart illustrating an example of a process of determining a power mode command.

Referring to FIG. 6, an exemplary process executed by VCIB 110 will be described below. FIG. 6 is a flowchart illustrating an example of a process of determining a power mode command. FIG. 6 shows a detailed view of the process of S24 of FIG. 5. VCIB 110 determines whether or not a Wake command has been received from ADK 200 in S251. When VCIB 110 receives Wake command (YES in S251), VCIB 110 determines whether or not the shift lever is a position corresponding to parking based on the shift lever status acquired in S21 in a subsequent S252. If the shift lever is at a position corresponding to parking (YES in S252), then in a subsequent S253, VCIB 110 determines whether the vehicle speed is 0 km/h based on the vehicle speed status obtained in S21. When the vehicle speed is 0 km/h (YES in S253), S254 determines whether the vehicle mode is the auto mode. If the vehicular mode is not the auto mode (NO in S254), VCIB 110 accepts Wake command (value "2") from ADK 200. On the other hand, when the shift lever is not at a position corresponding to parking (NO in S252), when the vehicle speed is not 0 km/h (NO in S253), or when the vehicle mode is in the auto mode (YES in S254), VCIB 110 changes the power mode command from the value "2" to the value "0" (no request) in S255. Thereafter, the processing returns to the main routine (the processing flow of FIG. 5).

L7 from the line L1 in the dashed-dotted line frame in FIG. 6, an exemplary operation of the vehicle 1 is shown. "t" in the dashed-dotted line frame indicates time. As shown in the line L7, the vehicle 1 decelerates and stops during the auto-mode. As shown in the line L2, it is assumed that Wake command is transmitted from ADK 200 to VCIB 110 in each of the period of t2 from t1 and the period of t4 from t3. Since the shift lever is not at a position corresponding to the parking in these periods, the power mode command is changed by S255 process. As shown in the line L5, when the immobilization command is switched from release to application in t5, the shift lever status is switched from D to P in t6 as shown in the line L6. In the auto-mode, ADK 200 moves the shift lever 40 to change the shift range. At this time, for example, even if Wake command is transmitted from ADK 200 to VCIB 110 by t7, the auto-mode is in progress even if the shift lever is at a position corresponding to parking and the vehicle speed is 0 km/h. Therefore, the power mode command indicating Wake command is invalidated by S255 process. Therefore, the transition to the wake mode is suppressed by t8 as shown by the broken line L4, and the in-operation mode is maintained as shown by the line L3. As a result, each of the control devices other than the body system ECU is stopped, and it is suppressed that the control device is determined to be in the failed state, so that the autonomous operation can be resumed thereafter.

As described above, according to the present embodiment, the wake command is invalidated even if Wake command is received from ADK 200 during the auto-mode. Therefore, it is possible to suppress the control device other than the body system ECU being stopped among the plurality of control devices. As a result, it is possible to suppress a failure state being determined by interrupting communication or the like due to a part of the plurality of control devices being in a stopped state. Therefore, it is possible to quickly resume the autonomous driving. Therefore, it is possible to provide a vehicle that performs an appropriate operation in response to a request from an autonomous driving system.

In some cases, VCIB 110 receives a wake command from ADK 200 in the in-operation mode (YES in S251 of FIG. 6). In this case, VCIB 110 requests the base vehicle 120 to change the power supply mode in accordance with the wake command when it is determined that the shift lever is at the position corresponding to the parking and the vehicle speed is 0 km/h and is not in the automated mode (S26 in FIG. 5). In response to a request from VCIB 110, the base vehicle 120 changes the power supply mode of VP 100 (S16 in FIG. 5). As described above, VCIB 110 determines whether or not the state is suitable for shifting to the wake mode, and when it determines that the state is suitable for shifting to the wake mode, VCIB 110 requests the base vehicle 120 to shift to the wake mode. Therefore, it is possible to suppress the base vehicle 120 being required to enter the wake mode in an inappropriate situation.

The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A vehicle comprising:

an autonomous driving system that performs autonomous driving of the vehicle;

a vehicle platform capable of receiving a command related to the autonomous driving from the autonomous driving system, wherein:

the vehicle platform includes a base vehicle including a plurality of control devices and a vehicle control interface that interfaces between the vehicle platform and the autonomous driving system; and the vehicle control interface deactivates a part of the control devices of the vehicle platform during execution of the autonomous driving, and disables a wake command when the wake command is received from the autonomous driving system, the wake command requesting a transition to a power mode in which the vehicle control interface is activated.

2. The vehicle according to claim 1, wherein when the base vehicle receives the wake command from the vehicle control interface, the base vehicle activates the vehicle control interface and a body system control device, among the control devices, and deactivates another control device.

3. The vehicle according to claim 1, wherein:

the vehicle further includes an operation member that receives an operation to switch between activation of the vehicle and deactivation of the vehicle; and when the operation member receives an operation to deactivate the vehicle, the vehicle platform assumes that the wake command has been received, and activates the vehicle control interface and a body system control device, among the control devices, and deactivates another control device.

4. The vehicle according to claim 1, wherein when the wake command is received when a shift position is a parking position, while the vehicle is stationary, and during execution of manual driving in which the base vehicle is operable by a user, the vehicle platform activates a body system control device, among the control devices, and deactivates another control device.

* * * * *